United States Patent
Moroni et al.

(10) Patent No.: US 8,290,455 B2
(45) Date of Patent: *Oct. 16, 2012

(54) ACCESSORY DEVICE FOR A FIELD TRANSMITTER

(75) Inventors: Andrea Moroni, Gorla Minore (IT); Ronaldo Dos Santos, Porlezza (IT)

(73) Assignee: ABB S.p.A., Milan (IT)

( * ) Notice: Subject to any disclaimer, the term of this patent is extended or adjusted under 35 U.S.C. 154(b) by 952 days.

This patent is subject to a terminal disclaimer.

(21) Appl. No.: 12/296,384

(22) PCT Filed: Mar. 19, 2007

(86) PCT No.: PCT/EP2007/052593
§ 371 (c)(1),
(2), (4) Date: Oct. 7, 2008

(87) PCT Pub. No.: WO2007/115906
PCT Pub. Date: Oct. 18, 2007

(65) Prior Publication Data
US 2009/0258618 A1  Oct. 15, 2009

(30) Foreign Application Priority Data
Apr. 11, 2006 (IT) .............. MI2006A0715

(51) Int. Cl.
*H04B 1/034* (2006.01)
(52) U.S. Cl. .......... 455/128; 324/202; 335/205
(58) Field of Classification Search .......... 455/128; 324/202
See application file for complete search history.

(56) References Cited

U.S. PATENT DOCUMENTS

| | | | | |
|---|---|---|---|---|
| 5,167,626 A * | 12/1992 | Casper et al. | ............. | 604/891.1 |
| 6,473,711 B1 * | 10/2002 | Sittler et al. | ............. | 702/138 |
| 6,854,566 B2 * | 2/2005 | Sweet et al. | ............. | 187/395 |
| 7,490,769 B2 * | 2/2009 | Hall | ............. | 235/400 |
| 2004/0023623 A1 * | 2/2004 | Stauch et al. | ............. | 455/115.1 |
| 2004/0175013 A1 * | 9/2004 | Gleissner | ............. | 381/363 |
| 2004/0263482 A1 * | 12/2004 | Goertz | ............. | 345/173 |
| 2007/0191970 A1 * | 8/2007 | Orth et al. | ............. | 700/17 |
| 2008/0221446 A1 * | 9/2008 | Washburn et al. | ............. | 600/437 |

FOREIGN PATENT DOCUMENTS

EP  1 538 422 A1  6/2005

OTHER PUBLICATIONS

Form PCT/ISA/210 (International Search Report) dated Jul. 10, 2007.
Form PCT/ISA/237 (Written Opinion of the International Searching Authority) dated Jul. 10, 2007.

* cited by examiner

*Primary Examiner* — Ryan Jager
(74) *Attorney, Agent, or Firm* — Buchanan Ingersoll & Rooney PC

(57) ABSTRACT

An accessory device for a field transmitter comprising an enclosure housing an electronic processing unit. Said device comprises a portable supporting body removably couplable with the transmitter and on which there are provided at least one activation unit which can be operated by a user, and an electronic processing circuit which is operatively interlocked with said activation unit and is suitable to be operatively connected to the electronics of the transmitter so as to transmit one or more signals thereto following actuation of the activation unit.

20 Claims, 8 Drawing Sheets

ACCESSORY DEVICE FOR A FIELD TRANSMITTER

The present invention relates to an accessory device for a field transmitter having improved structure and characteristics.

It is known, in industrial process control systems, that to sense/measure one or more physical variables of a process fluid, i.e. absolute, relative or differential pressure, flow, level and the like, specific field transmitters are widely used.

In their most common and widespread embodiment, these field transmitters comprise a suitably configured enclosure, inside which there are housed the various components for sensing, typically including: sensing means, often comprising a pressure sensor used to obtain easily from one or more relative, differential or absolute pressure measurements, measurement values also relating to other physical variables of the controlled process fluid which would be more difficult to transduce directly; appropriate primary electronic circuits for processing signals coming from the sensing means; secondary electronic circuits for processing signals coming from the primary electronic circuits and then delegated with managing communication with other transmitters or with control units; displays for on-site viewing of the sensed variables, terminal blocks for the various connections; and electrical power supply circuits of the components, etc.

In addition, these transmitters are generally provided with specific devices to perform other operations and functionalities common to all or specific to the type of transmitter or practical application in which it is used; for example, calibration operations must be performed, which during installation allow setting of a minimum value, generally zero, and a maximum value, typically the span/full scale value which define the ends of the measurement range of said transmitter. These operations, which must be performed with extreme precision, can also cause further problems in relation to use; an example of this is calibration of transmitters installed in sites where there are risks of explosion.

In everyday practice, there is often the need, for various requirements, to operatively interact with the transmitter and in particular to communicate with the internal electronic part, i.e. to perform calibration or re-calibration operations, or to transmit specific commands or instructions, to update a software code residing in said electronic unit, or to repair or completely replace a damaged or obsolete internal database, and the like.

At the current state of the art, these operations are performed in a manner that is not entirely satisfactory as they require, at least in the majority of cases, laborious operations, devices dedicated ad hoc case by case, etc. Therefore, the principal aim of the present invention is to produce an accessory device for a field transmitter which allows the prior art drawbacks to be overcome, and in particular, which is able to offer multiple functionality so as to perform operations of different types, which has an optimized constructive structure, both as regards installation and simplified use, and offers suitable characteristics of reliability and safety in use.

This aim is achieved by an accessory device for a field transmitter of the type comprising an enclosure housing an electronic processing unit, characterized in that it comprises a portable supporting body removably couplable with the transmitter and on which there are provided at least one activation unit which can be operated by a user, and an electronic processing circuit which is operatively interlocked with said activation unit and is suitable to be operatively connected to the electronics of the transmitter so as to transmit one or more signals thereto following actuation of the activation unit.

Further characteristics and advantages of the invention will be more apparent from the description of preferred but not exclusive embodiments of the device according to the invention, illustrated by way of a non-limiting example in the accompanying drawings, wherein.

Figure 8:
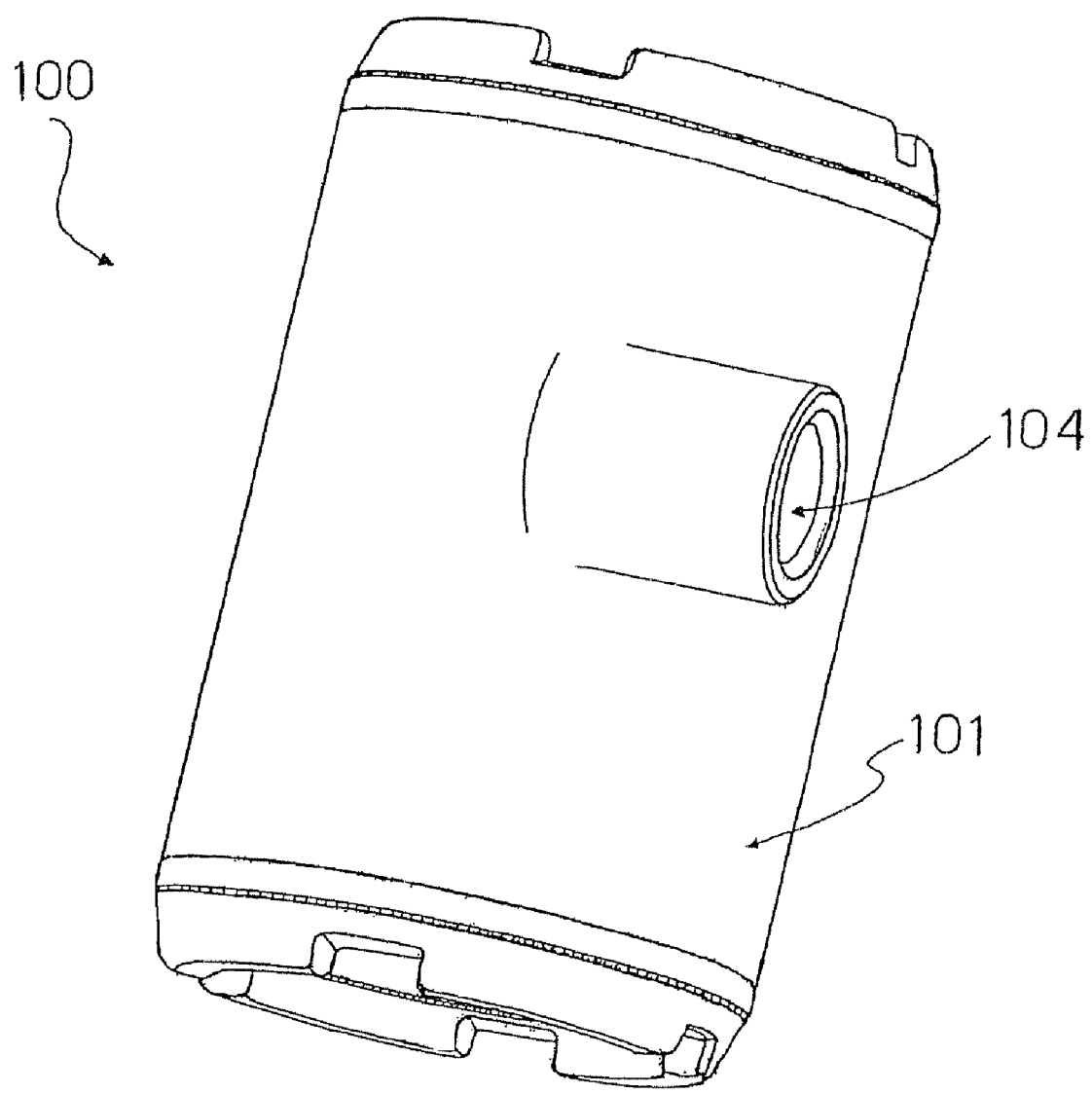
FIG. 8 is a perspective view of a field transmitter suitable for coupling with an accessory device according to the invention.

As previously indicated, the accessory device according to the invention, a possible embodiment of which is illustrated in the accompanying figures, is intended to be operatively coupled with a field transmitter; these transmitters are industrial devices suitable to sense/measure a physical variable of a process fluid, i.e. pressure. An example of a field transmitter, in particular a pressure transmitter, is represented in FIG. 8 with the reference number 100, which, according to widely known embodiments and for this reason not illustrated in detail, comprises an enclosure 101 housed inside which there are various components, generally including a sensor, such as a pressure sensor, electronic processing means, indicated schematically in FIG. 6 by the reference number 102 and comprising, for example, a microprocessor, which are operatively associated with the sensor and process the signals sensed thereby, a terminal block 103 for the various internal and external connections to the transmitter, i.e. to an electric power supply source, etc.

Figure 1:
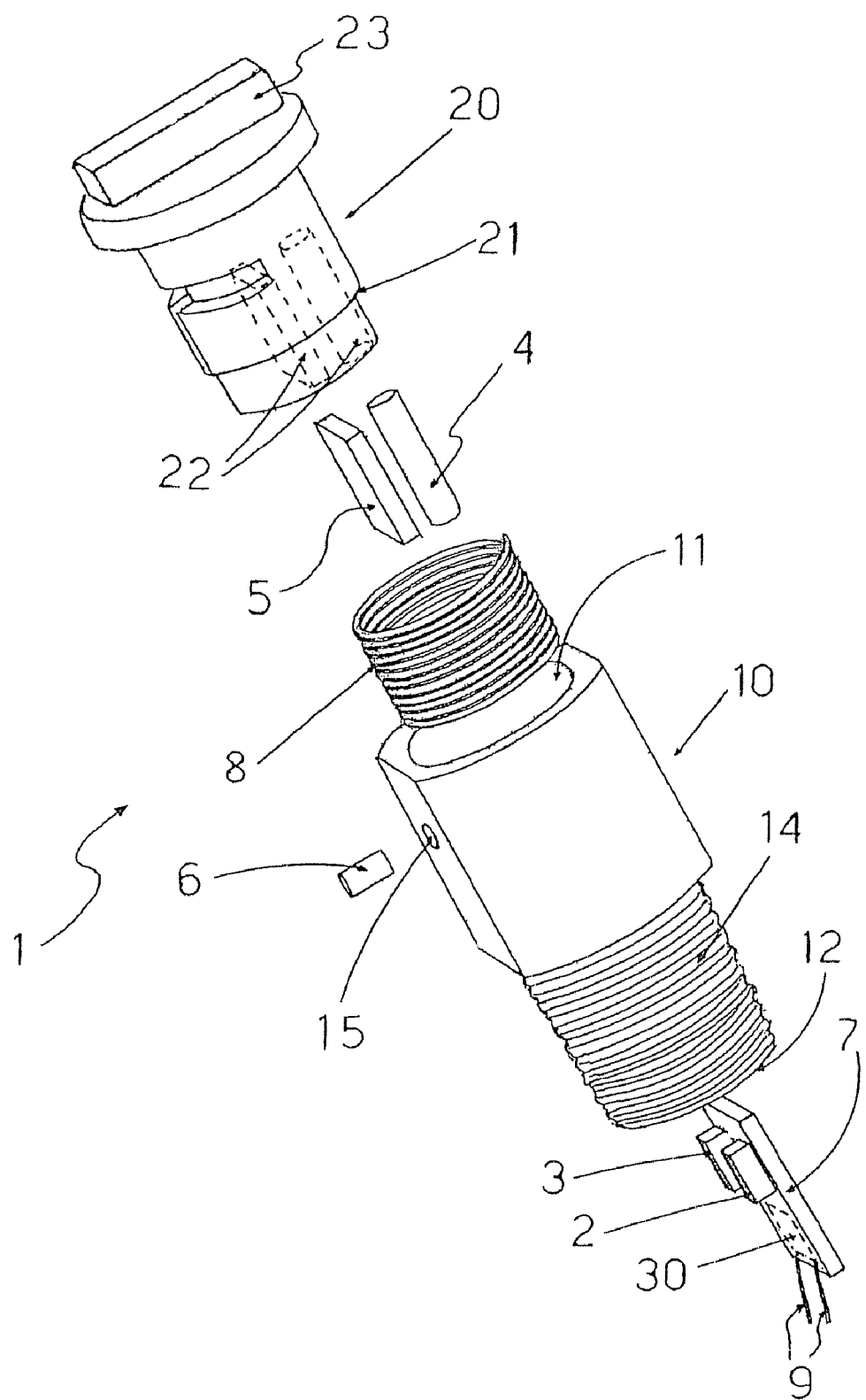
FIG. 1 is a perspective exploded view illustrating a possible embodiment of the accessory device according to the invention.
Figure 6:
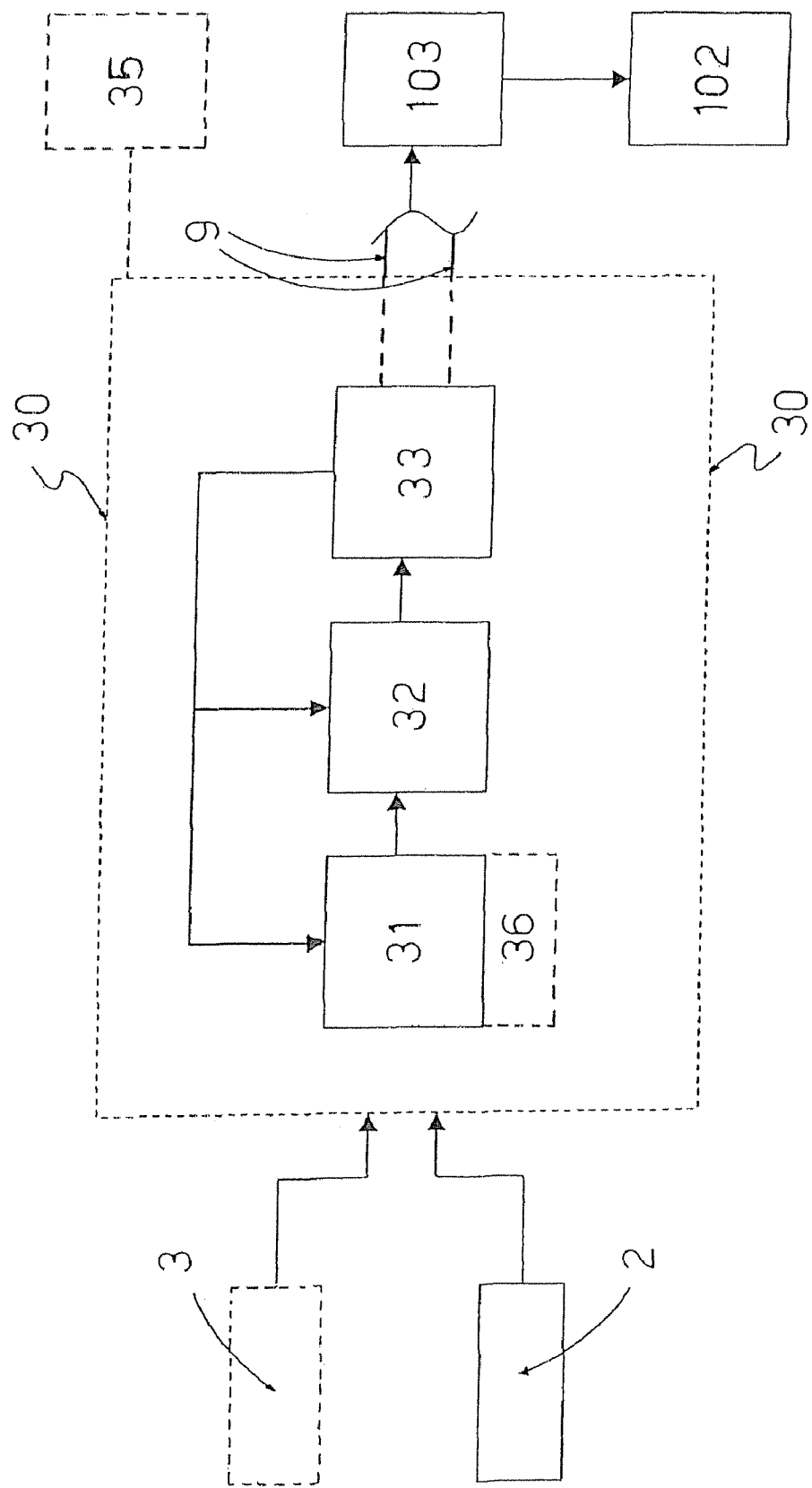
FIG. 6 is a block diagram of an electronic processing circuit used in the device according to the invention.

Advantageously the accessory device according to the invention comprises a portable supporting body, indicated as a whole in the example in FIG. 1 by the reference number 1, which is removably couplable to the transmitter and on which there are provided at least one activation unit which can be operated by a user, and an electronic processing circuit, indicated in FIG. 6 with the reference number 30, which is operatively interlocked with the activation unit and is suitable to be operatively connected to the electronics 102 of the transmitter 100 to transmit thereto one or more signals following actuation of the activation unit.

These signals can, for example, be signals required for calibration of the transmitter, standard or private commands for configuration thereof, operations to download software, data and/or information to a database residing in the electronics 102 and the like.

Preferably, the activation unit comprises a push button device which can be operated directly by a user.

According to a particularly preferred embodiment, the activation unit is of the magnetic type, i.e. actuation by a user determines activation of the electronic processing circuit 30 interlocked therewith through magnetic forces/fields; in particular, as will be more apparent from the description of an embodiment illustrated in FIGS. 1-5, the activation unit comprises magnetic actuation means, such as an activation magnet 4 and an optional protective shield 5 to prevent undesired activations, and at least a first elements for sensing magnetic fields, such as a reed relay 2, which is operatively connected to the electronic processing circuit 30 and is activated by magnetic actuation means, in particular by the magnetic field generated by the magnet 4; in this case, when activated magnetically, the first element 2 allows passage of a corresponding input signal (or several signals) towards the electronic processing circuit 30.

In turn, the electronic processing circuit 30 is advantageously configured so as to transmit signals to the electronics 102 of the transmitter through a digital communication protocol, i.e. of the HART type; preferably, the electronic circuit 30 is configured to function like an FSK ("Frequency Shift Keying") modem according to the standard Bell 202.

According to a particularly preferred embodiment, the accessory device according to the invention comprises a pair of conductors 9, i.e. two simple wires, which are connected to the electronic processing circuit 30 and are suitable to be connected to the terminal block 103 of the transmitter; advantageously, along said wires said one or more signals are transmitted towards the electronic unit 102 of the transmitter and electrical power flows from the power supply line (operatively connected to the terminal block) of the transmitter towards said electronic processing circuit 30.

In this way, the connection wires 9 are exploited to obtain the power supply and to convey signals to be transmitted.

Figure 7:
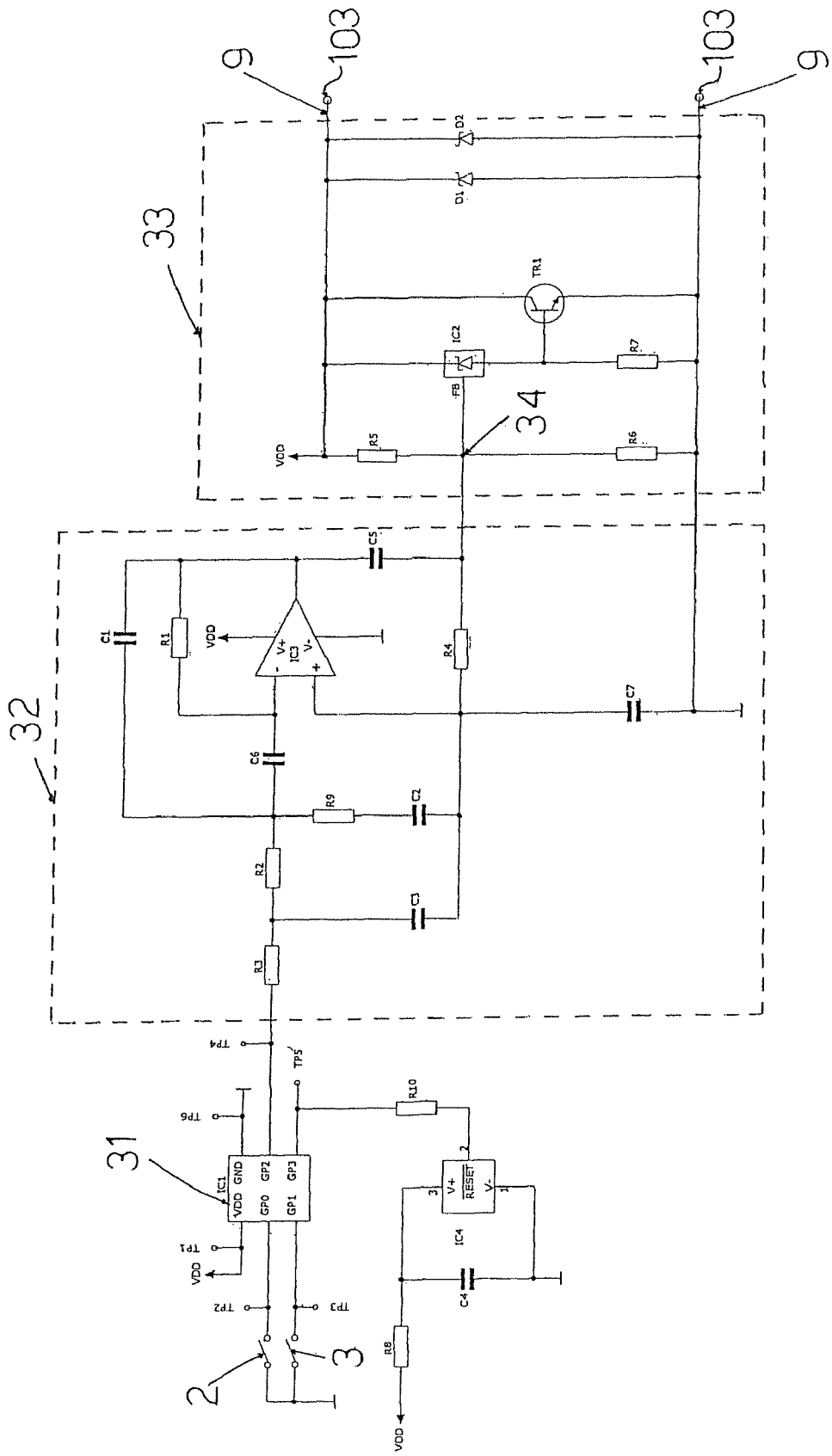
FIG. 7 is a circuit diagram illustrating a possible embodiment of the electronic circuit in figure.

FIG. 6 illustrates a block diagram of the electronic processing circuit 30, while FIG. 7 illustrates a possible embodiment of said circuit wherein R (R1, R2, etc.) indicates resistors, C indicates capacitors, D indicates diodes, and so forth. In particular, the electronic processing circuit 30 comprises: a microprocessor unit 31, a filter circuit 32 and a circuit for adjusting the power supply voltage 33 which is connected to the terminal block 103 by the two conducting wires 9. In particular, the microprocessor unit 31, which comprises, for example, a model PIC10F206 microcontroller, is connected to the first element for sensing magnetic fields 2 and receives signals therefrom when the activation unit is actuated; for example, said actuation is performed by a user who acts on the device to modify the position of the magnet 4 so that the magnetic field generated thereby activates the element 2 which in turn determines the passage of one or more corresponding signals towards the microprocessor unit 31.

The microprocessor unit then reprocesses the signal/signals received sending corresponding input signals to the filter circuit 32, i.e. in the form of square wave signals; the circuit 32, which can preferably be constituted by an electronic band pass filter with standard configuration as illustrated in FIG. 7, filters the signal received from the unit 31 transforming it into a sinusoidal type physical signal with an (ideally) null mean value so as not to interfere with the direct current measurement signal of the transmitter; finally, the signal/signals thus processed reach the circuit for adjusting the power supply voltage 33, in particular the node 34, and through this and the two wires 9 pass towards the terminal block 103 and from this to the electronic processing unit 102, which is operatively connected to said terminal block 103, thereby allowing the operation triggered by actuation by the user to be performed.

Besides adjusting the level of the output signal/signals towards the electronic unit of the transmitter, the circuit for adjusting the voltage 33 is also entrusted with adequately protecting the entire electronic processing circuit 30 limiting the power supply voltage.

There can also be provided at least one serial port 35, operatively connected to the electronic processing circuit 30, so as to allow direct connection, i.e. with a device, such as a PC, with which to exchange any data to be transmitted to the transmitter. Moreover, there can be provided a non-volatile memory unit 36, which can, for example, be incorporated in the microprocessor unit 31.

A possible embodiment of the accessory device according to the invention in an example of application suitable to calibrate the zero value and the span/full scale value of a field transmitter 100 will now be described in greater detail. This example of embodiment is clearly to be intended purely by way of example, without in any way limiting the possible scopes of application and alternative embodiments.

As illustrated in FIG. 1, directly on the portable supporting body 1 there are disposed a first element for sensing magnetic fields 2 the activation of which allows calibration of a first measurement parameter of the transmitter 100, i.e. the zero of the transmitter, and a second element for sensing magnetic fields 3 the activation of which allows calibration of a second measurement parameter of the transmitter, i.e. the span or full scale value.

On the body 1 there are also positioned magnetic actuation means suitable to activate, in this embodiment, the first 2 and/or the second element 3, and the electronic processing circuit 30 which is operatively connected to the two elements 2 and 3 and is intended to be operatively connected, during installation, to the electronic unit 102 of the transmitter.

Preferably, the portable supporting body 1 comprises two principal component parts removably coupled to each other of which, in the example of embodiment in FIGS. 1-5: a first component 10, operatively connected to which are the first 2 and the second element 3 for sensing magnetic activation fields, which is suitable to be removably connected to the enclosure 101 of the transmitter 100; and a second component 20 to which the magnetic actuation means are operatively connected.

Advantageously, the two components 10 and 20 are coupled relatively movably to each other so that, in operating conditions, the magnetic actuation means are positionable in a neutral non-actuating position of the first and of the second element 2 and 3, or in activating position/positions thereof; in particular, the magnetic actuation means are housed on the body of the second component 20 and are configured to take, following movement of the second component 20 with respect to the first component 10, besides the neutral non-activating position, a first position for activating only the first element for sensing magnetic fields 2, or alternatively, a second position for activating the second element for sensing magnetic fields 3.

In the embodiment illustrated in FIGS. 1-5, the first component 10 comprises a first hollow portion 11 suitable to at least partially house the second component 20, and a second portion 12, also hollow, in which the first and the second elements 2 and 3 for sensing magnetic fields, and the electronic circuit 30 associated therewith, are housed; the two hollow portions 11 and 12 extend on opposite sides to each other with respect to a solid dividing wall 13 which forms the bottom wall of both hollow portions.

Preferably, the second hollow portion 12 is threaded on at least part of the external surface 14 thereof, to allow screwing into a corresponding seat 104 provided on the outside of the enclosure 101 of the transmitter 100.

In turn, the second component 20 comprises a substantially solid body in the shape of a push button having a lower portion 21, i.e. substantially cylindrical in shape, suitable to be inserted inside the first hollow portion 11, and in which there is produced at least one seat 22 to house the magnetic actuating means, and an upper or top portion 23 which projects from the first hollow portion 11 to be actuated by an operator. In this case, one of the components of the portable supporting body 1 also becomes an integral part of the activation unit, constituting in practice a push button actuation device.

The magnetic actuation means preferably comprise an activation magnet 4 and a protective shield 5, produced, for example, with a plate made of ferromagnetic material, which are housed in two respective seats 22 produced in the lower portion 21 of the second component 20, for example, by forcing them into said seats 22 so that they are substantially integral with said second component 20.

In turn, the first 2 and second 3 element for sensing magnetic fields comprise, respectively, a first magnetic switch 2 and a second magnetic switch 3, i.e. constituted by reed relays, which are positioned on a supporting element or board 7, on which an electronic circuit 30 operatively connected thereto is also disposed; this supporting element 7, with the components disposed thereon, is housed in the second hollow portion 12 with the ends inserted in corresponding grooves produced in the inner walls of said second portion 12.

Figure 2:
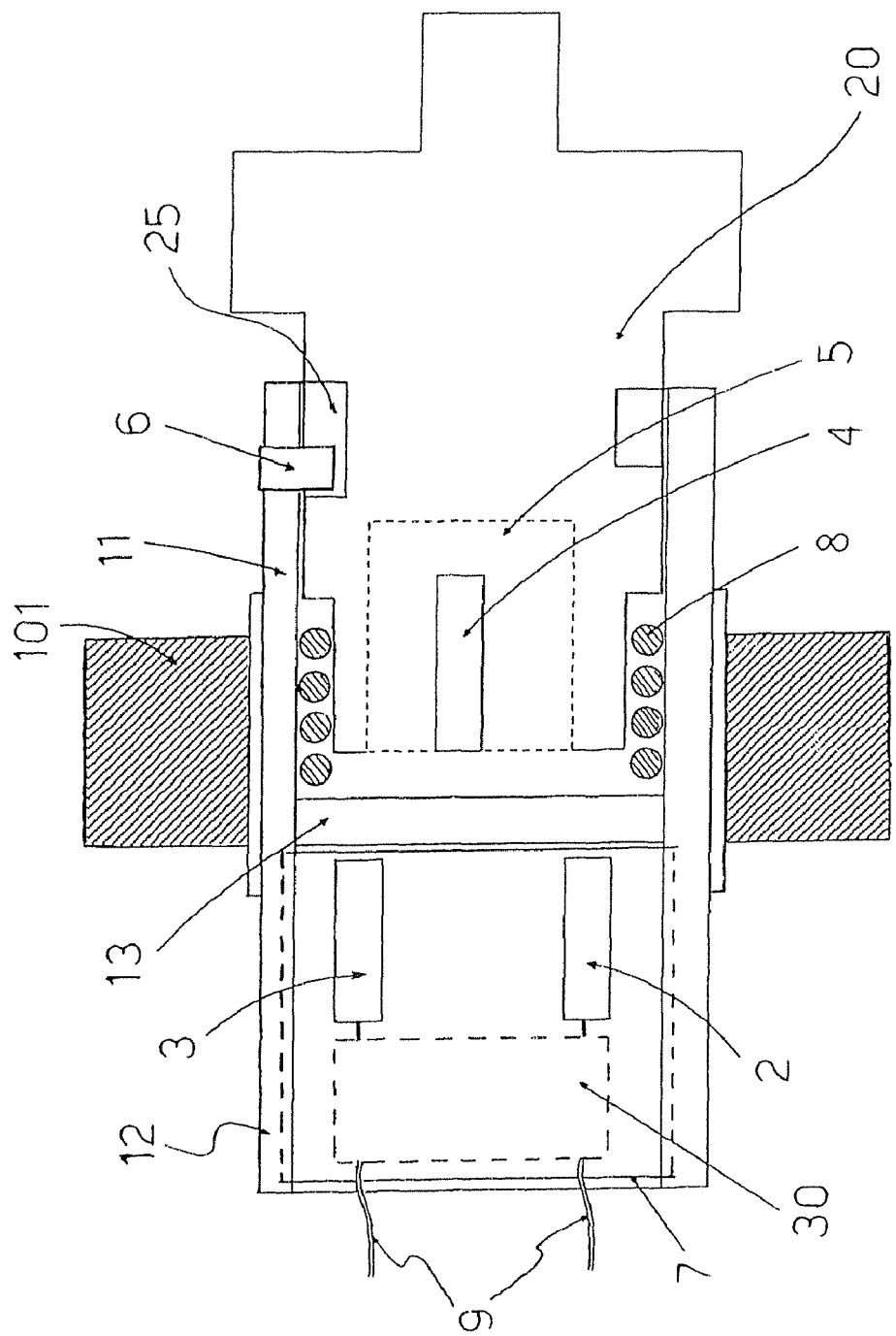
FIGS. 2-5 are sectional views schematically illustrating the device in FIG. 1 in some operating positions.
Figure 3:
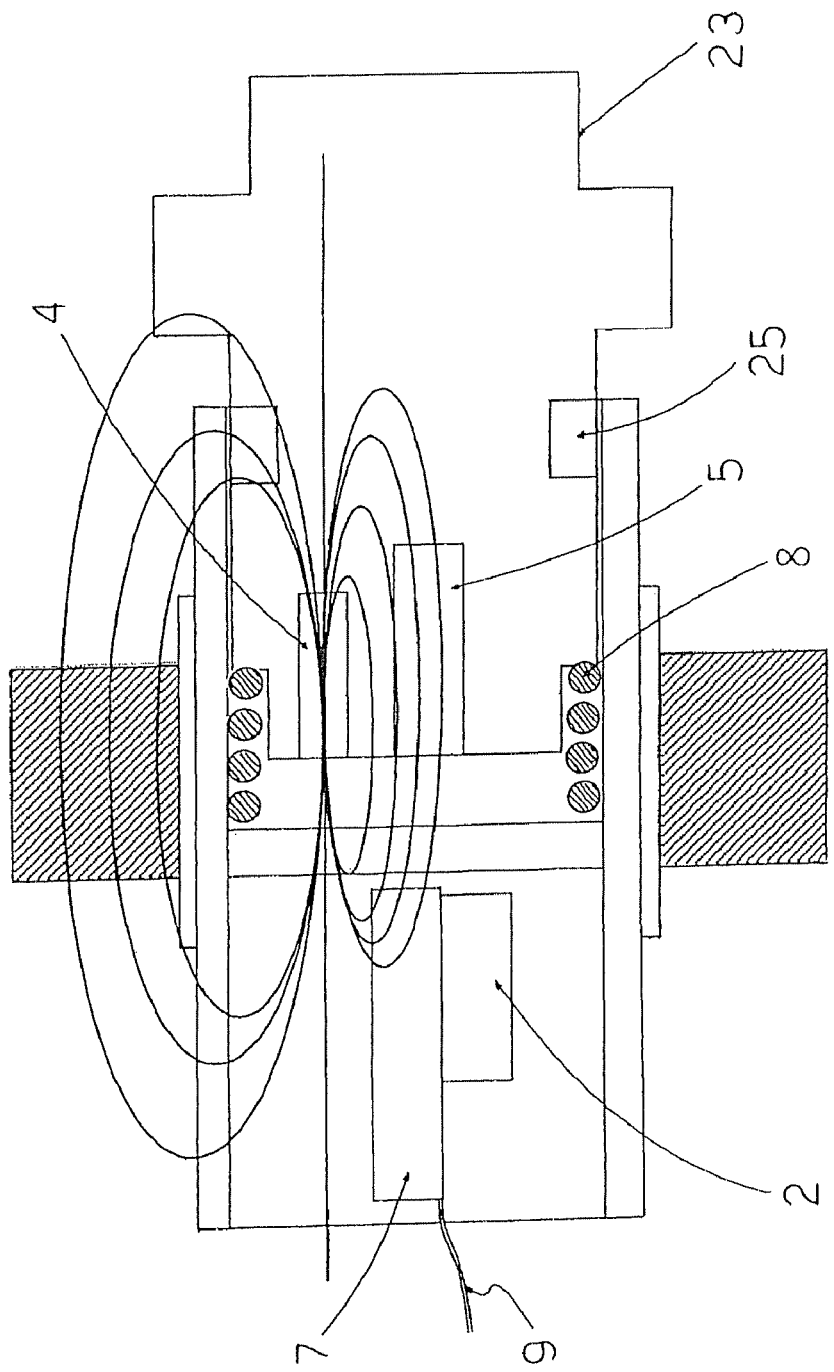

In the embodiment illustrated, the two components 10 and 20 are mechanically coupled to each other through means for operatively connecting and guiding the second component 20 in relation to the first component 10; in particular, these connecting and guiding means comprise a stopper pin 6 which, as illustrated in FIG. 2, passes through a through hole 15 disposed in the wall of the first hollow portion 11, and is inserted in a branched channel or race 25 produced in the lower portion 21 of the second component 20.

Moreover, the means for operatively connecting and guiding comprise an elastic element 8, such as a spring, which is disposed housed inside the first hollow portion 11 so as to encircle the lower portion 21 and act in contrast with the upper portion 23 of the second component 20.

During use, the accessory device is operatively connected to a transmitter by operatively connecting the electronic circuit 30 to the electronics of said transmitter; in particular, this operation can be performed simply by connecting the two wires 9 to the terminal block 103 of the transmitter which in turn is connected to the electronics 102 of said transmitter. The device is then connected mechanically by screwing the first component 10 into the threaded seat 104 so that the device takes the position illustrated schematically in FIG. 2. In this position, the pin 6 is inserted in the vertical section of the race 25 and the spring 8 holds the second component 20 at a suitable distance to prevent accidental activation of the two magnetic switches 2 and 3. In this neutral non-activating position the trend of the magnetic field resulting from interaction between magnet 4 and shield 5 is such that neither of the two magnetic switches 2 and 3 is activated, as illustrated schematically in FIG. 3.

Figure 4:
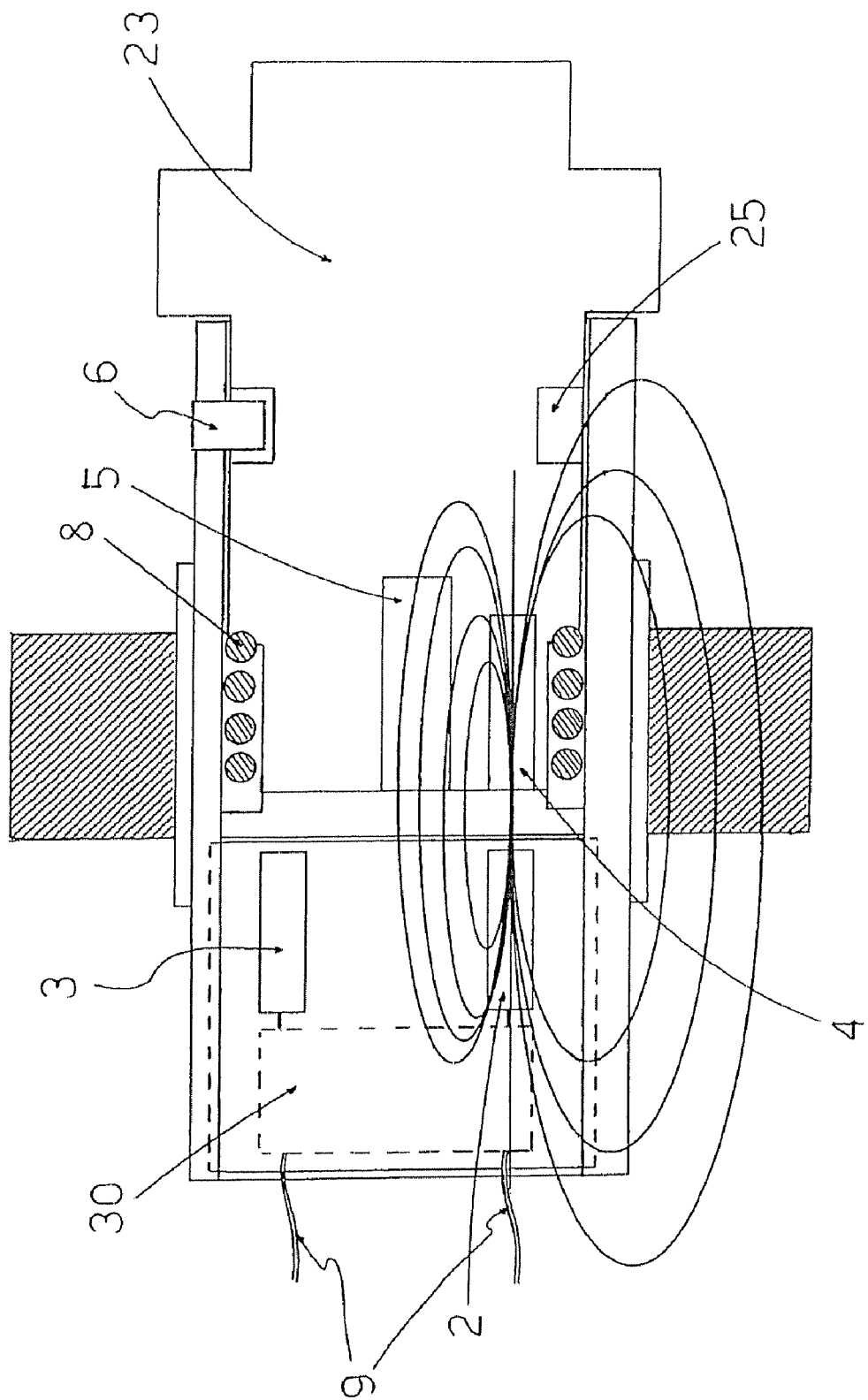

When calibration is performed, starting from the position in FIG. 2, an operator acts on the top portion 23 of the second component 20 pressing it downward and rotating it, for example, counter-clockwise; by virtue of this actuation, the pin 6 slides into one of the two lateral branches of the race 25 accurately guiding the movement of the second component 20 with respect to the first component 10; in this way, as illustrated in FIG. 4, the trend of the magnetic field caused by the magnet 4 and shield 5 assembly is such to magnetically activate only one of the two magnetic switches, i.e. the magnetic switch 2.

Figure 5:
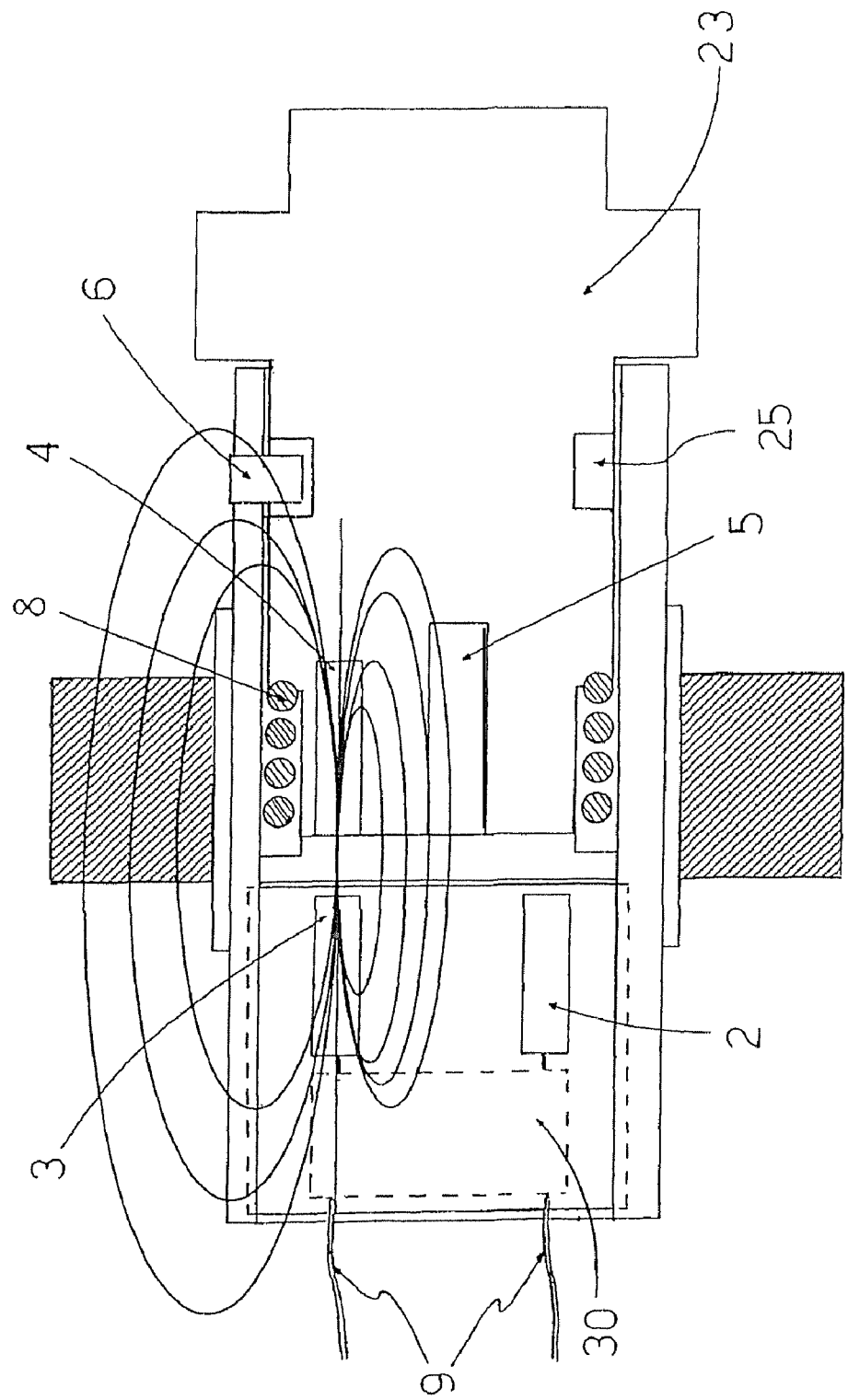

The same situation is obtained by rotating the second component 20 in the opposite direction to the previous one, with the pin 6 sliding in the other branch of the race and guiding movement so that the magnetic field determined by the magnet 4 and shield 5 assembly activates only the other magnetic switch 3, as illustrated in FIG. 5.

Activation of each magnetic switch 2 or 3, which in practice causes them to switch from an OFF state to an ON state, allows passage of a corresponding input signal towards the electronic circuit 30; these signals are suitably processed by the components of the circuit 30 as described previously and then, through the connection wires 9, are transmitted to the electronics 102 of the transmitter 100; consequently, the electronics of the transmitter sets first one and then the other parameter as a function of the signal received by one or other magnetic switch 2, 3.

In this way, the two parameters are in practice calibrated in sequence; as stated, these parameters allow, for example, setting of the zero and span/full scale values of the transmitter, thereby defining the ends of the measurement/sensing range.

Clearly, the description in the previous example relative to the calibration operations of the two parameters can be extended in entirely the same way to other types of application which require the transmission of signals, and consequently the performance of different operations, in which, for example, only one transmission "branch" is required, thereby fully omitting the part relating to the presence and operation of the second sensing element 3.

In practice, it has been seen how the accessory device according to the invention allows the aim and the objects set to be fully achieved, providing a series of advantages with respect to prior art. In fact, the device is produced according to a constructive structure optimized both as a whole and in the single elements, and which can be coupled to the transmitter as a separate accessory, easy to transport, replace or remove at any time, easy to use and functionally efficient. In particular, the device has a functionally stand-alone structure, on which all the basic elements required for transmission of signals of different type and content to the electronics of the transmitter are positioned directly, thereby making it suitable for applications with multiple functionality.

This stand-alone and multiple functionality also allows it to be used with field transmitters of various types. Therefore, a further object of the present invention is a field transmitter, in particular a pressure transmitter, characterized in that it comprises an accessory device as previously described.

In particular, the device has the great advantage of allowing configuration of a transmitter from the outside of the enclosure thereof, i.e. without having to open the cover, which is particularly advantageous in the case of use in areas with potentially explosive atmospheres. With respect to the example illustrated, the device thus conceived is susceptible to numerous modifications and variants, all falling within the scope of the inventive concept, as long as compatible with the functionalities for which they have been designed; for example, the portable supporting body could be produced with a different number of components (one or more), i.e. using a planar support, the shaping of the components could be modified with respect to the description in the example in FIGS. 1-5; the system for removable connection to the body of the transmitter could be produced differently; the operative connection to the electronics of the transmitter could be produced in another way, i.e. using other connectors, such as pins, etc.

Moreover, all details can be replaced by other technically equivalent elements; in practice, the type of materials within the scope of the applications described above, and the dimensions, can be any according to requirements and to the state of the art.

The invention claimed is:
1. An accessory device for a field transmitter comprising:
   an enclosure housing an electronic unit, wherein said accessory device comprises a portable supporting body removably couplable with the transmitter and on which there are provided at least an activation unit which can be operated by a user; and an electronic processing circuit which is operatively interlocked with said activation unit and is suitable to be operatively connected to the electronic unit of the transmitter so as to transmit one or more signals thereto following actuation of the activation unit.

2. An accessory device as claimed in claim 1, wherein said activation unit comprises a push button device.

3. An accessory device as claimed in claim 2, wherein said activation unit is of magnetic type.

4. An accessory device as claimed in claim 1, wherein said activation unit is of magnetic type.

5. An accessory device as claimed in claim 4, wherein said activation unit comprises magnetic actuation means and at least one first element for sensing magnetic fields which is activated by said magnetic actuation means and is operatively connected to said electronic processing circuit.

6. An accessory device as claimed in claim 5, wherein said portable supporting body comprises a first component which is suitable to be removably connected to the transmitter and to which said at least one first element for sensing magnetic fields is operatively associated, and a second component which is connected to the first component movably thereto and to which said magnetic actuation means are operatively associated.

7. An accessory device as claimed in claim 6, wherein said second component is movably coupled to the first component so that said magnetic actuation means are positionable alternatively in an activating position or in a non-activating position of said at least one element for sensing magnetic fields.

8. An accessory device as claimed in claim 7, wherein magnetic actuation means comprise an activation magnet and a protective shield housed in two corresponding seats of said second component.

9. An accessory device as claimed in claim 6, wherein it comprises at least one non-volatile memory unit.

10. An accessory device as claimed in claim 6, wherein said magnetic actuation means comprise an activation magnet and a protective shield housed in two corresponding seats of said second component.

11. An accessory device as claimed in claim 10, wherein said magnetic actuation means comprise an activation magnet and a protective shield housed in two corresponding seats of said second component.

12. An accessory device as claimed in claim 6, wherein said at least one first element for sensing magnetic fields comprises a first magnetic switch positioned on a supporting board on which an electronic processing circuit operatively connected thereto is also placed, said supporting board being housed in a hollow portion defined in said first component.

13. An accessory device as claimed in claim 12, wherein it comprises a pair of conductor wires connected to the electronic processing circuit and suitable to be connected to a terminal block of the transmitter, said one or more signals being transmitted towards the electronic unit of the transmitter and electrical power flowing from a power supply line towards said electronic processing circuit along said wires.

14. An accessory device as claimed in claim 5, wherein it comprises a pair of conductor wires connected to the electronic processing circuit and suitable to be connected to a terminal block of the transmitter, said one or more signals being transmitted towards the electronic unit of the transmitter and electrical power flowing from a power supply line towards said electronic processing circuit along said wires.

15. An accessory device as claimed in claim 14, wherein said electronic processing circuit comprises a microprocessor connected to said first element for sensing magnetic fields and which receives therefrom at least one signal corresponding to actuation of the activation unit; a signal filter circuit which filters the reprocessed signal output from the microprocessor; and a circuit for adjusting the power supply voltage which is operatively connected to the terminal block of the transmitter through said pair of wires along which said one or more signals are transmitted.

16. An accessory device as claimed in claim 14, wherein said electronic processing circuit is configured so as to transmit said one or more signals as an FSK modem according to the standard Bell 202.

17. An accessory device as claimed in claim 4, wherein said portable supporting body comprises a first component which is suitable to be removably connected to the transmitter and to which said at least one first element for sensing magnetic fields is operatively associated, and a second component which is connected to the first component movably thereto and to which said magnetic actuation means are operatively associated.

18. An accessory device as claimed in claim 1, wherein said electronic processing circuit is configured so as to transmit said one or more signals as an FSK modem according to the standard Bell 202.

19. An accessory device as claimed in claim 1, wherein it comprises a serial port operatively connected to said electronic processing circuit.

20. A field transmitter wherein it comprises an accessory device as claimed in claim 1.

* * * * *